(12) United States Patent
Pan et al.

(10) Patent No.: US 12,146,983 B2
(45) Date of Patent: *Nov. 19, 2024

(54) LIDAR ASSEMBLY WITH MODULARIZED COMPONENTS

(71) Applicant: BEIJING VOYAGER TECHNOLOGY CO., LTD., Beijing (CN)

(72) Inventors: Anan Pan, Fremont, CA (US); Henghui Jiang, Newark, CA (US); Youmin Wang, Berkeley, CA (US)

(73) Assignee: BEIJING VOYAGER TECHNOLOGY CO., LTD., Beijing (CN)

(*) Notice: Subject to any disclaimer, the term of this patent is extended or adjusted under 35 U.S.C. 154(b) by 998 days.

This patent is subject to a terminal disclaimer.

(21) Appl. No.: 17/134,298

(22) Filed: Dec. 26, 2020

(65) Prior Publication Data

US 2022/0179047 A1    Jun. 9, 2022

Related U.S. Application Data

(63) Continuation-in-part of application No. 17/115,787, filed on Dec. 8, 2020.

(51) Int. Cl.
| | |
|---|---|
| *G01S 7/481* | (2006.01) |
| *G01S 7/484* | (2006.01) |
| *G01S 7/486* | (2020.01) |
| *G01S 17/931* | (2020.01) |
| *G01S 17/89* | (2020.01) |

(52) U.S. Cl.
CPC .............. *G01S 7/481* (2013.01); *G01S 7/484* (2013.01); *G01S 7/486* (2013.01); *G01S 17/931* (2020.01); *G01S 17/89* (2013.01)

(58) Field of Classification Search
CPC .......... G01S 7/481; G01S 7/484; G01S 17/89; G01S 7/486; G01S 17/931; G01S 7/4813; G01S 17/86; G01S 7/4817
USPC ........................................................ 356/4.01
See application file for complete search history.

(56) References Cited

U.S. PATENT DOCUMENTS

| | | | | |
|---|---|---|---|---|
| 2022/0179048 A1* | 6/2022 | Pan | ........................ | G01S 7/4813 |
| 2022/0179051 A1* | 6/2022 | Pan | ........................ | G01S 7/4813 |
| 2022/0179074 A1* | 6/2022 | Pan | ........................ | G01S 7/4912 |

* cited by examiner

*Primary Examiner* — Daniel L Murphy
(74) *Attorney, Agent, or Firm* — BAYES PLLC

(57) ABSTRACT

Embodiments of the disclosure provide a control system for a LiDAR assembly. The control system includes a control module affixed on a printed circuit board (PCB), configured to control a transmitter and a receiver of the LiDAR assembly to emit and receive optical signals. The control system also includes an interface module affixed on a first bracket, configured to operatively couple the control module to the transmitter and the receiver. The control module and the interface module are configured to be positioned at predetermined positions of the LiDAR assembly through the PCB and the first bracket respectively.

20 Claims, 23 Drawing Sheets

1300

| Emit optical signals to an environment surrounding the LiDAR assembly | S1302 |

↓

| Scan the emitted optical signals | S1304 |

↓

| Detect returned optical signals from the environment | S1306 |

FIG. 13

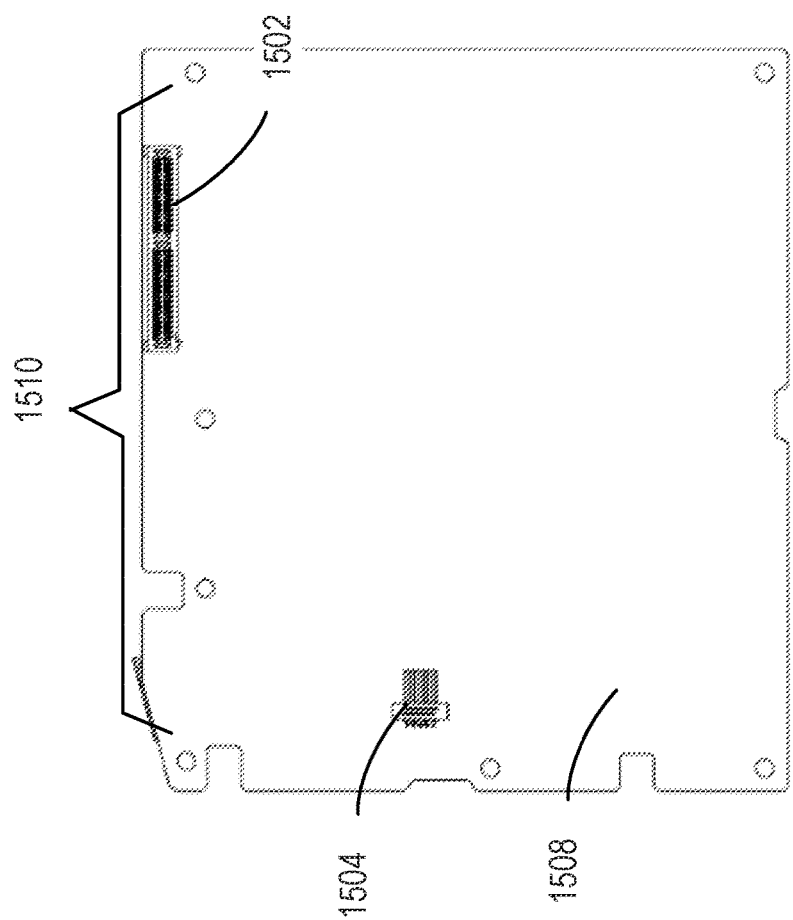

LIDAR ASSEMBLY WITH MODULARIZED COMPONENTS

CROSS-REFERENCE TO RELATED APPLICATIONS

This is a continuation in part of U.S. application Ser. No. 17/115,787, filed Dec. 8, 2020, which is incorporated by reference in its entirety herein. This application is also related to the following applications, both of which are incorporated by reference in their entireties herein:
Application Ser. No. 17/134,286, filed Dec. 26, 2020, and entitled "LIDAR ASSEMBLY WITH MODULARIZED COMPONENT"; and
Application Ser. No. 17/134,302, filed Dec. 26, 2020, and entitled "LIDAR ASSEMBLY WITH MODULARIZED COMPONENT".

TECHNICAL FIELD

The present disclosure relates to a light detection and ranging (LiDAR) system, and more particularly to, a LiDAR assembly with modularized components.

BACKGROUND

Optical sensing systems such as LiDAR systems have been widely used in advanced navigation technologies, such as to aid autonomous driving or to generate high-definition maps. For example, a typical LiDAR system measures the distance to a target by illuminating the target with pulsed laser light beams and measuring the reflected pulses with a sensor such as a photodetector or a photodetector array. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

To perform the measurement, a LiDAR system includes many key components such as emitter(s), detector(s), power supplier(s), controller(s), to name a few. In existing LiDAR assemblies, because the components are normally arranged in an ad hoc manner, they lack accessibility and removability. For example, it is hard to replace one or more components of the LiDAR system without disassembling the entire LiDAR system. Moreover, because of the arrangement, cables connecting those components are messy. As a result, when one or more components need to be removed (e.g., the component calls for a replacement, maintenance, and/or an update), the entire LiDAR system must be disassembled. Also, the messy cables make the assembly of the LiDAR system not production friendly.

Embodiments of the disclosure address the above problems by a LiDAR assembly with modularized components.

SUMMARY

In one example, embodiments of the disclosure include a control system for a LiDAR assembly. The control system includes a control module affixed on a printed circuit board (PCB), configured to control a transmitter and a receiver of the LiDAR assembly to emit and receive optical signals. The control system also includes an interface module affixed on a first bracket, configured to operatively couple the control module to the transmitter and the receiver. The control module and the interface module are configured to be positioned at predetermined positions of the LiDAR assembly through the PCB and the first bracket respectively.

In another example, embodiments of the disclosure include a method for assembling a control system for a LiDAR assembly. The method includes assembling an interface module affixed to a first bracket at a first predetermined position of the LiDAR assembly through the first bracket. The method further includes assembling a control module affixed to a PCB at a second predetermined position of the LiDAR assembly through the PCB. The control module is configured to control a transmitter and a receiver of the LiDAR assembly to emit and receive optical signals. The control module is operatively coupled to the transmitter and the receiver through the interface module.

In a further example, embodiments of the disclosure include a LiDAR assembly. The LiDAR assembly includes a transmitter configured to emit optical signals to an environment surrounding the LiDAR assembly and a receiver configured to detect returned optical signals from the environment. The LiDAR assembly also includes a control system configured to control operations of the transmitter and the receiver. The control system includes a control module affixed on a printed circuit board (PCB), configured to control the operation of the transmitter and the receiver. The control system further includes an interface module affixed on a first bracket, configured to operatively couple the transmitter and the receiver with the control module. The control module and the interface module are positioned at predetermined positions of the LiDAR assembly through the PCB and the first bracket respectively.

It is to be understood that both the foregoing general description and the following detailed description are exemplary and explanatory only and are not restrictive of the invention, as claimed.

BRIEF DESCRIPTION OF THE DRAWINGS

FIG. 13 shows a flow chart of an exemplary optical sensing method performed by a LiDAR assembly with modularized components, according to embodiments of the present disclosure.

FIGS. 15A-15B illustrate an exemplary control module compatible with the control system shown in FIG. 14, according to embodiments of the present disclosure.

DETAILED DESCRIPTION

Figure 1:
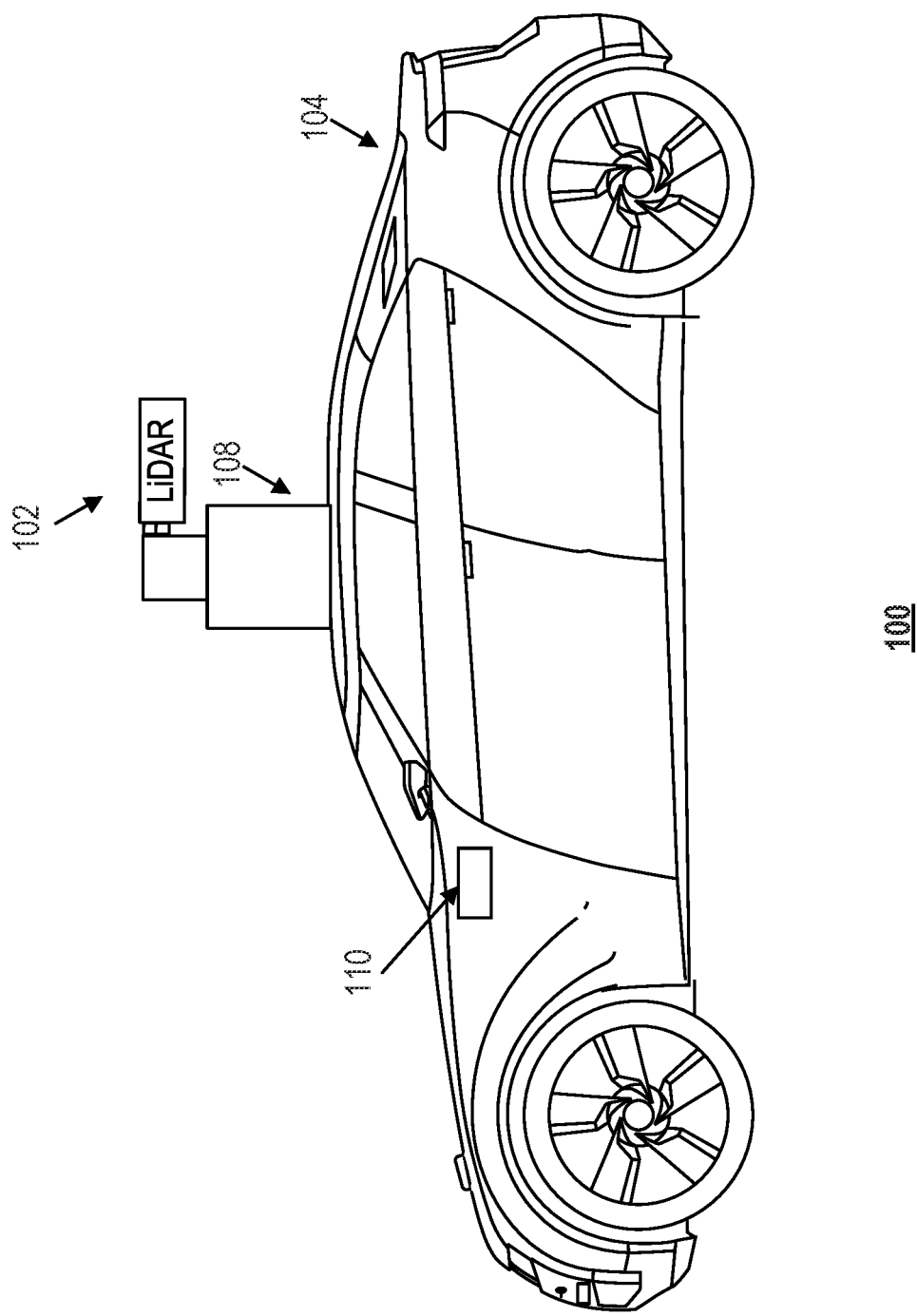
FIG. 1 illustrates a schematic diagram of an exemplary vehicle equipped with a LiDAR assembly with modularized components, according to embodiments of the present disclosure.

Reference will now be made in detail to the exemplary embodiments, examples of which are illustrated in the accompanying drawings. Wherever possible, the same reference numbers will be used throughout the drawings to refer to the same or like parts.

The optical sensing system (e.g., a LiDAR system) may be used to scan objects, and the detecting result (e.g., point cloud data) can be used for advanced navigation technologies, such as to aid autonomous driving or to generate high-definition maps. For example, the optical sensing system may include a transmitter configured to emit optical beams (e.g., laser beams) steered by a scanning module to scan an object and a receiver configured to receive/detect optical beams reflected by the object. The optical sensing system may also include a control module (e.g., a controller) for controlling the transmitter, the receiver, and the scanning module to scan the object and for processing the detected optical beams to obtain detecting results such as point cloud data. The optical sensing system may further include a power module configured to provide electrical power to the optical sensing system.

As will be disclosed in detail below, the optical sensing system (e.g., the LiDAR assembly with modularized components) disclosed herein has modularized components each affixed to an individual bracket (e.g., being modularized) before being positioned in the optical sensing system. In some embodiments, the modularized components are positioned on a specifically designed frame to ensure their predetermined positions. For example, when assembling the optical sensing system, the transmitter and the receiver may be pre-affixed on a same bracket to form an integrated transmitter-receiver module which is then positioned to the frame by sliding the bracket to a pair of guideways mounted on the frame. The relative positions of those modules are also specifically designed to provide quick assembly and easy access to each of the modules.

In some embodiments, the frame may have a plurality of opens on more than one faces and is manufactured in one piece without mechanical connections therebetween. As the frame for positioning the modules is manufactured from a single piece of metal instead of consisting of many pieces fastened or otherwise connected together, no extra torque is introduced to the system by the frame itself. This eases the alignment and calibration of the LiDAR assembly for installment. Also, the plurality of openings in more than one face of the frame further increase the accessibility and removability of each module within the LiDAR assembly. The increased accessibility and removability of each component can make the replacement and/or upgrade of the modules much easier than existing LiDAR system architectures and can facilitate quick assembly and reliable manufacturing of the LiDAR assembly in mass production.

Furthermore, to facilitate the communication between and among the components (e.g., increase the robustness of data transmission) and reduce space occupied by individual modules, the optical sensing system may further include an interface module operatively coupled to the above-mentioned modules for transmitting data and providing electrical power.

When being used in the above-mentioned applications (e.g., aid autonomous driving or generate high-definition maps), the optical sensing system can be equipped on a vehicle. For example, FIG. 1 illustrates a schematic diagram of an exemplary vehicle equipped with a LiDAR assembly with modularized components, according to embodiments of the present disclosure. Consistent with some embodiments, vehicle 100 may be a survey vehicle configured for acquiring data for constructing a high-definition map or 3-D buildings and city modeling. Vehicle 100 may also be an autonomous driving vehicle.

As illustrated in FIG. 1, vehicle 100 may be equipped with a LiDAR assembly with modularized components 102 (also referred to as "LiDAR assembly 102" hereinafter) mounted to a body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR assembly 102 or sensor 110 can be equipped on vehicle 100 are not limited by the example shown in FIG. 1 and may be modified depending on the types of LiDAR assembly 102 and sensor 110 and/or vehicle 100 to achieve desirable 3D sensing performance.

Consistent with some embodiments, LiDAR assembly 102 and sensor 110 may be configured to capture data as vehicle 100 moves along a trajectory. For example, a transmitter of LiDAR assembly 102 may be configured to scan the surrounding environment. LiDAR assembly 102 measures distance to a target by illuminating the target with laser beams and measuring the reflected/scattered pulses with a receiver. The laser beams used for LiDAR assembly 102 may be ultraviolet, visible, or near-infrared, and may be pulsed or continuous wave laser beams. In some embodiments of the present disclosure, LiDAR assembly 102 may capture point clouds including depth information of the objects in the surrounding environment, which may be used for constructing a high-definition map or 3-D buildings and city modeling. As vehicle 100 moves along the trajectory, LiDAR assembly 102 may continuously capture data including the depth information of the surrounding objects (such as moving vehicles, buildings, road signs, pedestrians, etc.) for map, building, or city modeling construction.

Figure 2:
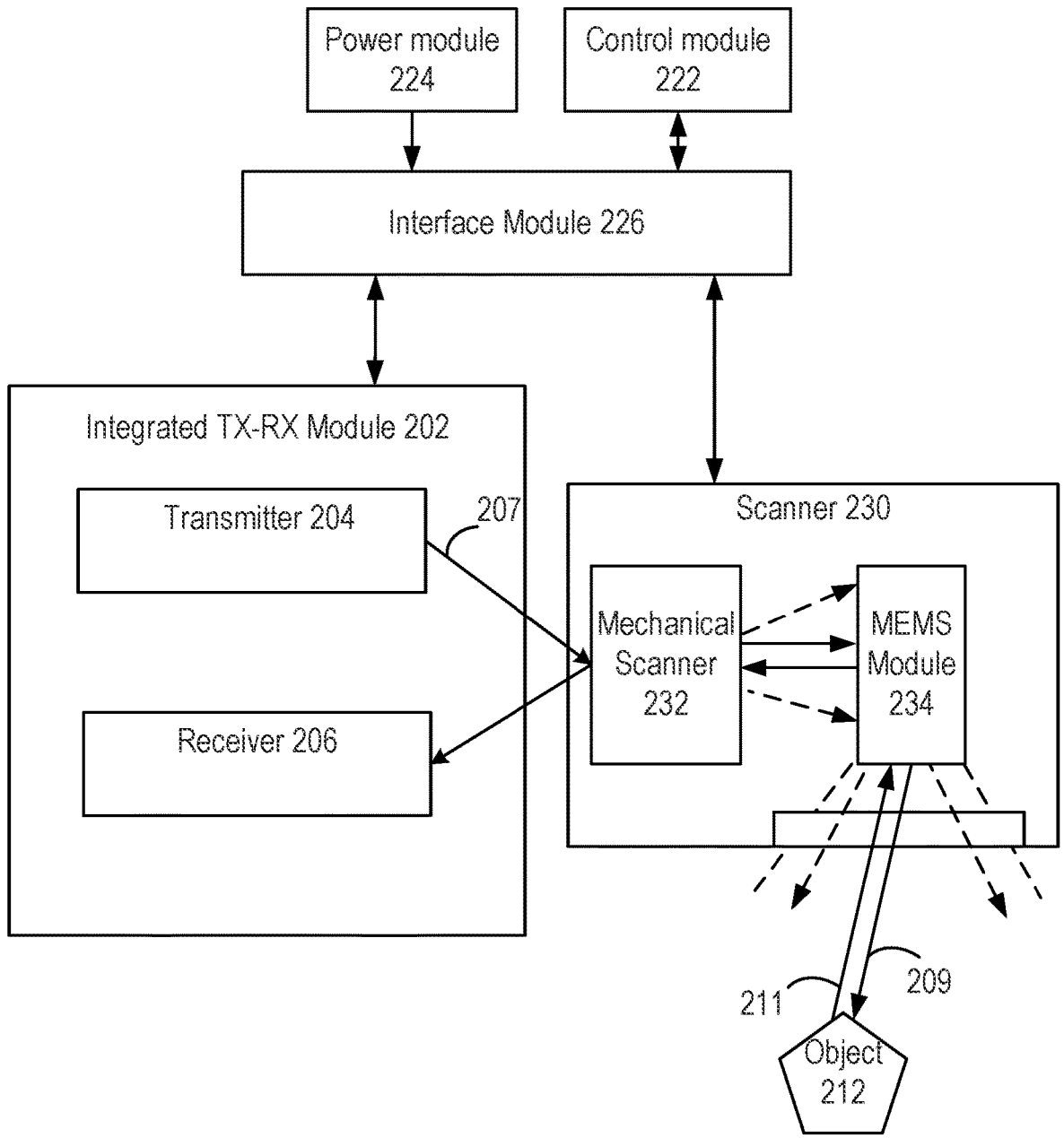
FIG. 2 illustrates a block diagram of an exemplary LiDAR assembly with modularized components, according to embodiments of the present disclosure.

FIG. 2 illustrates a block diagram of an exemplary LiDAR assembly 102 with modularized components, according to embodiments of the present disclosure. As illustrated, LiDAR assembly 102 may include an integrated transmitter-receiver module 202 and a scanner 230 coupled to integrated transmitter-receiver module 202. Integrated transmitter-receiver module 202 may include transmitter and receiver components integrated into a single package. For example, integrated transmitter-receiver module 202 may include transmitter 204 and receiver 206 sharing a same base and affixed to a same bracket.

In some embodiments, each of transmitter 204 and receiver 206 may further include its specific components (not shown). For instance, transmitter 204 may further include a laser emitter for emitting optical signals and optics for shaping the emitted optical signals. For another instance, receiver 206 may include receiving lens for collecting the returned optical signals from scanner 230 and detectors for detecting the returned optical signal collected by the lens. Receiver 206 may further include a readout circuit for converting the detected signal to an electrical signal for further processing, e.g., by a control module 222 of LiDAR assembly 102.

Specifically, transmitter 204 may emit optical beams (e.g., pulsed laser beams, continuous wave (CW) beams, frequency modulated continuous wave (FMCW) beams) to scanner 230. Transmitter 204 may include one or more laser sources (e.g., a laser emitter) and one or more optics. According to one example, transmitter 204 may sequentially emit a stream of laser beams to a scanner 230 which would later scan the stream of laser beams in different directions within and collectively forming a filed-of-view (FOV) (now shown).

In some embodiments, the emitted laser beam may be received and scanned by scanner 230. In some embodiments, as shown in FIG. 2, scanner 230 may include a mechanical scanning module 232 for scanning a first dimension and a MEMS scanning module 234 for scanning a second dimension, orthogonal to the first dimension. In some embodiments, mechanical scanning module 232 may include at least one of a galvanometer mirror, a mirror polygon, or flash lens driven/steered by a mechanical device for scanning a slow axis of the FOV with a sawtooth scanning trajectory or a triangle scanning trajectory. MEMS scanning module 234 may include a mirror or a mirror array driven/steered by MEMS devise(s) for scanning a fast axis of the FOV with a sinusoidal scanning trajectory. It is contemplated that the type of mirror, the driving mechanism, and the scanning trajectory are not limited to the examples described herein. Any suitable scanning mechanisms not departing from the spirit and scope of the present disclosure may be implemented by scanner 230 for scanning the FOV at a proper range of detection angles. For example, scanner 230 may use MEMS mirrors for scanning both dimensions.

In some embodiments, object 212 within the FOV may be made of a wide range of materials including, for example, non-metallic objects, rocks, rain, chemical compounds, aerosols, clouds and even single molecules. In some embodiments, at each time point during the scan, scanner 230 may scan laser beams 209 to object 212 in a direction within a range of scanning angles by rotating the deflector(s) (e.g., mirror(s)) in mechanical scanning module 232 and/or MEMS scanning module 234).

Receiver 206 may be configured to detect returned laser beams 211 returned from object 212. Upon contact, laser beams can be reflected/scattered by object 212 via backscattering, such as Rayleigh scattering, Mie scattering, Raman scattering, and fluorescence. Returned laser beams 211 may be in a same or different direction from laser beams 209. The pulses in returned laser beam 211 may have the same waveform (e.g., bandwidth and wavelength) as those in laser beams 209. In some embodiments, scanner 230 may collect laser beams returned from object 212 and direct returned laser beams 211 to receiver 206. Upon receiving returned laser beams 211 from scanner 230, receiver 206 may output electrical signals reflecting the intensity of returned laser beams 211.

In some embodiments, receiver 206 may include lens, a detector (e.g., a photodetector), and a readout circuit. For example, the lens may be configured to collect returned laser beams 211 directed by scanner 230 in a respective direction and converge returned laser beams 211 to focus on the detector. At each time point during the scan, returned laser beams 211 directed by scanner 230 may be collected by the lens. The detector may be configured to detect returned laser beams 211 converged by the lens. In some embodiments, the detector may convert the laser light (e.g., returned laser beams 211) into electrical signals (e.g., currents or voltage signals). The readout circuit may be configured to integrate, amplify, filter, and/or multiplex the signal detected by the detector and transfer the integrated, amplified, filtered, and/or multiplexed signal onto output parts (e.g., control module 222) for readout.

Control module 222 may be configured to control integrated transmitter-receiver module 202 (e.g., control transmitter 204 and/or receiver 206) and scanner 230 (e.g., control mechanical scanning module 232 and/or MEMS scanning module 234) to perform detection/sensing operations. For instance, control module 222 may control the laser emitter of control transmitter 204 to emit laser beams 207, mirror(s) of mechanical scanning module 232 and/or MEMS scanning module 234 to rotate to scan the FOV, and the detector of receiver 206 to detect returned laser beams 211. In some embodiments, control module 222 may also implement data acquisition and analysis. For instance, control module 222 may collect digitalized signal information from the readout circuit of the receiver, determine the distance of object 212 from LiDAR assembly 102 according to the travel time of laser beams, and construct a high-definition map or 3-D buildings and city modeling surrounding LiDAR assembly 102 based on the distance information of object(s) 212.

In some embodiments, control module 222 may include components (not shown) such as a processor, a memory, and a storage for performing various control functions. In some embodiments, these components of control module 222 may be implemented on an integrated circuit (IC), for example, an application-specific integrated circuit (ASIC) or a field-programmable gate array (FPGA)) disposed on a printed circuit board (PCB).

Power module 224 may be configured to provide electrical power to modules such as integrated transmitter-receiver module 202, scanner 230, and/or control module 222. In some embodiments, power module 224 may include a DC power supply, an AC power supply, or any other power supply that can provide suitable voltage, current, and frequency to electrically power the modules.

In some embodiments, to facilitate the communication (e.g., transmission of control signals and/or obtained data) between and among the modules and/or with an outside device (e.g., a processing device and/or a manifestation device), LiDAR assembly 102 may further include an interface module 226 electrically connecting acquisition modules such as integrated transmitter-receiver module 202 and/or scanner 230 to control module 222 for transmitting data. Integrated transmitter-receiver module 202, scanner 230, and/or control module 222 may also be electrically connected to power module 224 through interface module 226 for receiving electrical power. For example, instead of having interfaces for transmitting data and/or receiving electrical power on each module individually, modules such as integrated transmitter-receiver module 202, scanner 230, and/or control module 222 may share the interface circuits integrated on interface module 226. This can further free up the space occupied by those modules. As will be described in detail below, interface module 226 may include a PCB for providing support, mounting, and protections to the integrated interface circuits. Having interface module 226 can avoid the messy connecting cables, providing optimal cable routing and component connection, while increasing the robustness of data transmission. In some embodiments, interface module 226 may further be connected to an external connector of an outside device for further processing or manifesting the acquired data.

As will be described in detail along with the description of FIGS. 3A-10, the above-mentioned modules may be positioned to predetermined positions of LiDAR assembly 102 by being affixed to a custom designed one-piece frame using different positioning mechanisms.

Figure 3A:
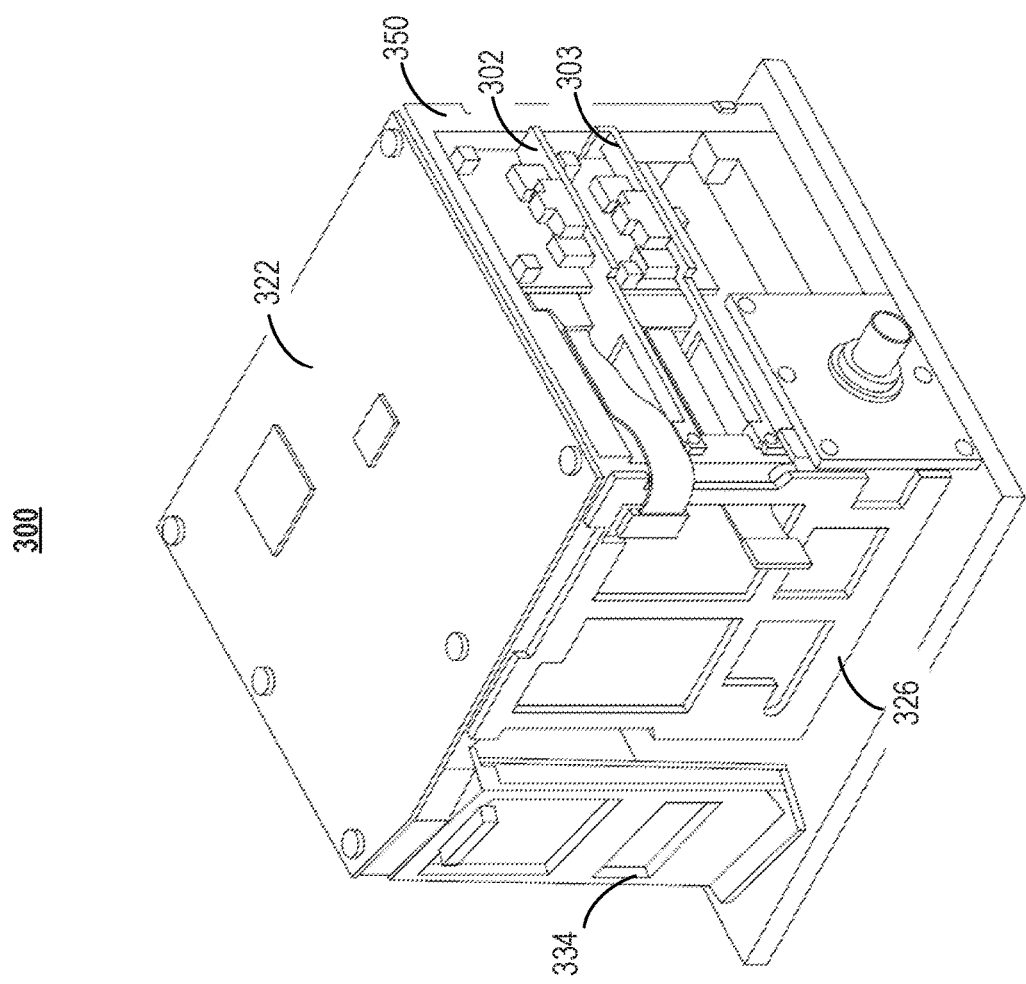
FIGS. 3A-3B illustrate an exemplary LiDAR assembly with modularized components, according to embodiments of the present disclosure.
Figure 3B:
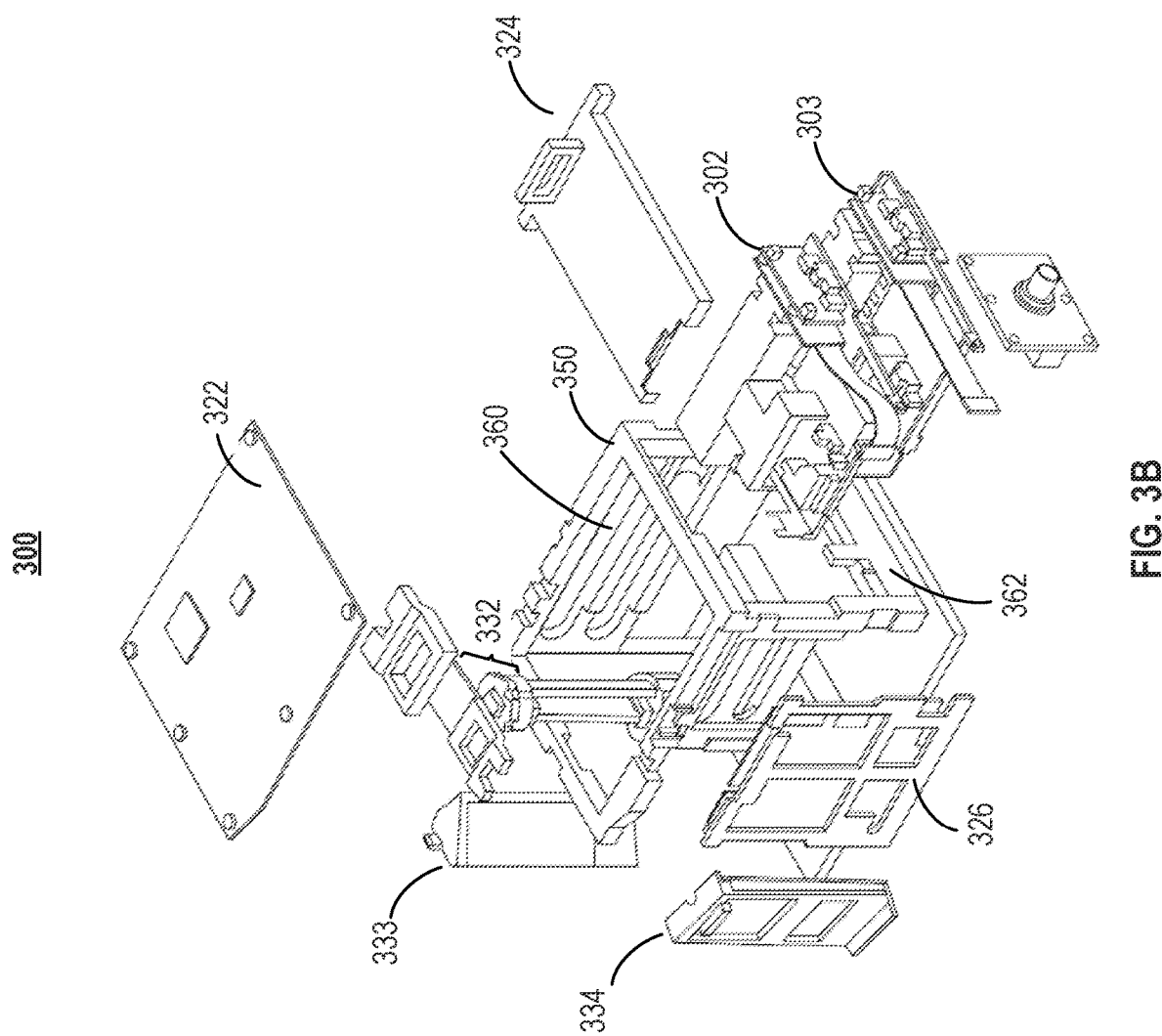

FIG. 3A illustrates an exemplary top front perspective view of a LiDAR assembly 300 and FIG. 3B illustrates an exemplary exploded view of LiDAR assembly 300 according to embodiments of the present disclosure. As described above, LiDAR assembly 300 may include an integrated transmitter-receiver module 302, a mechanical scanning module 332, a MEMS scanning module 334, a control module 322, a power module 324, and an interface module 326, respectively mounted on a one-piece frame 350 at predetermined positions of LiDAR assembly 300. In some embodiments, to provide quick assembly and removal of certain modules (e.g., modules that may need frequent maintenance and/or upgrades such as integrated transmitter-receiver module 302 and/or power module 324), LiDAR assembly 300 may also include pairs of guideways (e.g., a first pair of guideway 360 and a second pair of guideway 362) for allowing the corresponding module to slide in and out the assembly. In some embodiments, to have a larger FOV (e.g., a larger angle of scan), LiDAR assembly 300 may further include a second integrated transmitter-receiver module 303 having a similar or same structure and affixing mechanism with integrated transmitter-receiver module 302 (described in detail below) and will not be repeated for ease of illustration. In some embodiments, second integrated transmitter-receiver module 303 may be disposed beneath integrated transmitter-receiver module 302 such that modules 302 and 303 collectively cover the scanning angle of the FOV.

Figure 4:
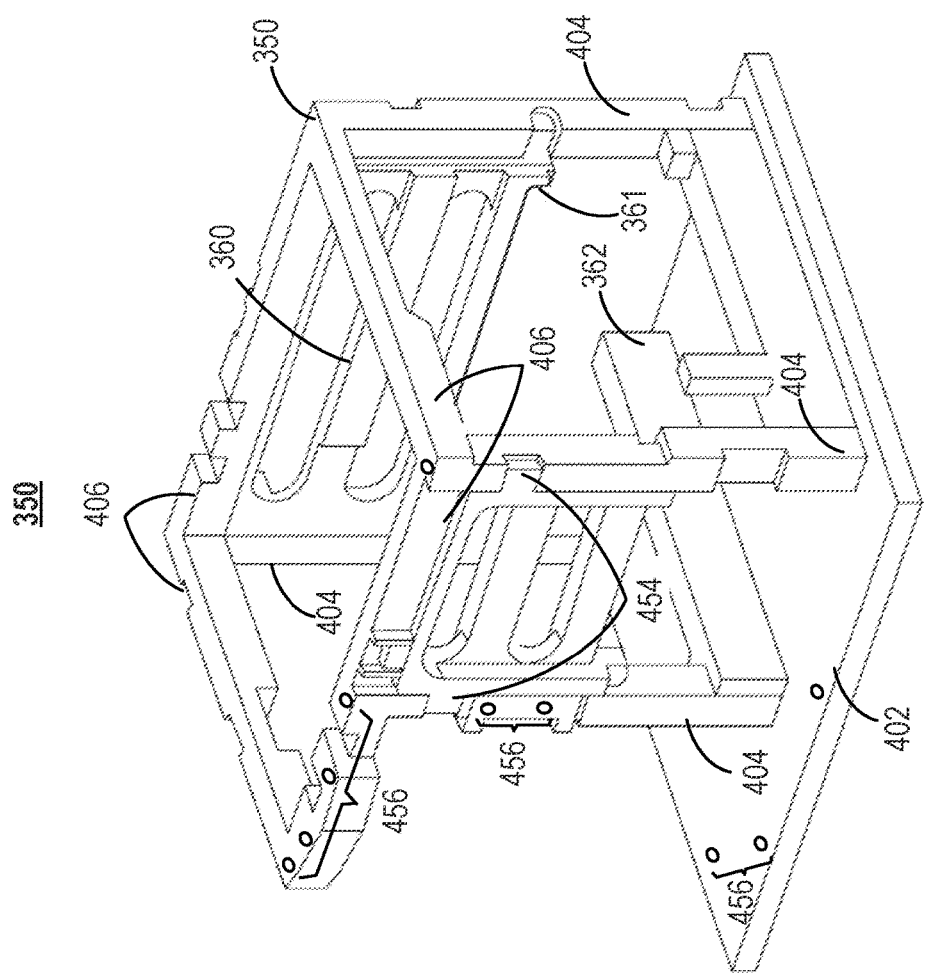
FIG. 4 illustrates an exemplary one-piece frame of the LiDAR assembly shown in FIGS. 3A and 3B, according to embodiments of the present disclosure.

In some embodiments, as illustrated in FIG. 4, one-piece frame 350 may be a chassis frame including a base 402 (e.g., a base plate) at a bottom face of one-piece frame 350, a plurality of vertical beams 404 (e.g., 4 vertical beams) supported by base 402, and a plurality of horizontal beams 406 supported by vertical beams 404. In some embodiments, vertical beams 404 and horizontal beams 406 collectively form a plurality of openings on a top face opposite base 402 and at least one lateral face of one-piece frame 350. The plurality of openings can facilitate quick assembly of LiDAR assembly 300 and may provide easy access to a target module without interference with other modules of LiDAR assembly 300.

In some embodiments, one-piece frame 350 may include positioning mechanisms such as pairs of guideways (e.g., first pair of guideways 360 and second pair of guideways 362) positioned by a plurality of positioning tabs 454 and fastener holes 456 for fastening the modules. For example, positioning tabs 454 may be disposed on vertical beams 404 and/or horizontal beams 406 for affixing/positioning first pair of guideways 360 and second pair of guideways 362. The pairs of guideways may include lock point(s) 361 for positioning the corresponding module (e.g., integrated transmitter-receiver module 302 and/or power module 324) that slides on the guideways. One-piece frame 350 may also include fastener holes 456 disposed on base 402, vertical beams 404, and horizontal beams 406 for fastening the modules such as control module 322, power module 324, interface module 326, mechanical scanning module 332, and MEMS scanning module 334. It is contemplated that the number and the position of the positioning tabs, the locking points, and the fastener holes on one-piece frame 350 shown in FIG. 4 are not exhaustive and are examples for explanatory only. More or less or different positions of the positioning tabs, the locking points, and/or the fastener holes may be used for affixing and/or positioning the above-mentioned modules.

In some embodiments, one-piece frame 350 may be made from a single piece of material (e.g., metal) without mechanical connections therebetween. For example, one-piece frame 350 including base 402, vertical beams 404, and horizontal beams 406 may be formed integrally by cutting a piece of metal (e.g., aluminum or aluminum alloy) using high grade machine tools (e.g., cutting portions of the single piece of metal away to form the openings). In some other embodiments, one-piece frame 350 may be formed integrally using a metal casting process (e.g., die casting) where molten metal (e.g., aluminum or aluminum alloy) is forced under high pressure into a mould cavity having the shape of one-piece frame 350. In some embodiments, the shape of one-piece frame 350 is custom designed according to the predetermined positions of the individual modules in LiDAR assembly 300. For example, the positioning mechanisms (e.g., the positions of positioning tabs 454 for positioning corresponding guideways and the positions of fastener holes 456 on one-piece frame 350) may be determined based on the predetermined positions of the corresponding modules they affix.

Figure 5:
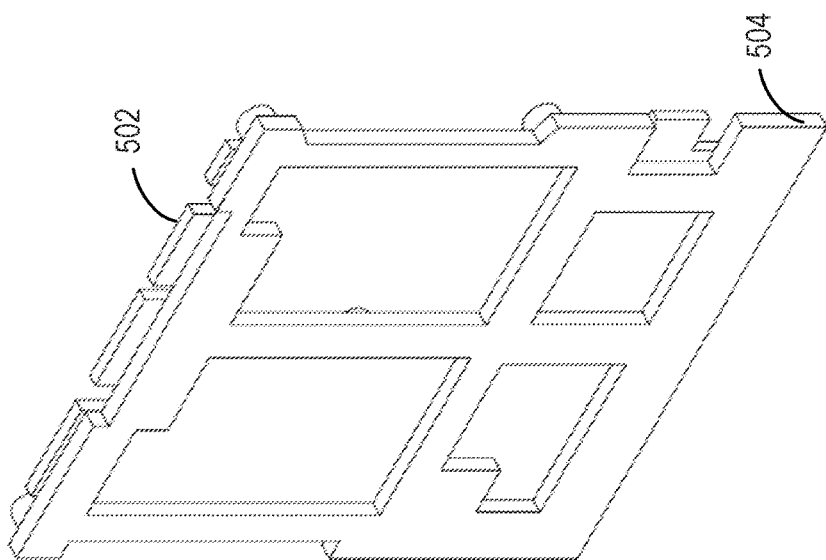
FIG. 5 illustrates an exemplary interface module of the LiDAR assembly shown in FIGS. 3A and 3B, according to embodiments of the present disclosure.

Referring back to FIGS. 3A and 3B, in some embodiments, interface module 326 may be assembled outside a lateral face of one-piece frame 350 and may be affixed to one-piece frame 350 through fasteners (not shown) screwed into one or more fastener holes 456 (shown in FIG. 4). For example, as illustrated in FIG. 5, interface module 326 may include interface circuits integrated on a PCB 502. PCB 502 may be affixed to a bracket 504 configured to provide support, mounting, and protection. For example, interface module 326 may be affixed to one-piece frame 350 through bracket 504, e.g., interface module 326 may be affixed to one-piece frame 350 by screwing both ends of bracket 504 (e.g., a top end and a bottom end, opposite to the top end) to one of horizontal beams 406 and base 402 of one-piece frame 350 respectively by screwing fasteners (not shown) into one or more fastener holes 456 on horizontal beams 406 and base 402.

In some embodiments, each of PCB 502 and PCBs 702 and 1002 (will be described below) may be a board that has one or more etched sheet layers (e.g., layers with etched conductive tracks, pads, and/or other suitable conductive features) disposed on a non-conductive substrate. Electrical components such as the interface circuits may be disposed on an etched sheet layer and may be mechanically supported and electrically connected by the etched sheet layer. In some embodiments, bracket 504 may be a metal bracket, a plastic bracket, or any suitable type of bracket capable of providing stability of the structure and ensure appropriate electrical insulation. As will be described in detail along with the assembling process for LiDAR assembly 300 below, when assembling LiDAR assembly 300, interface module 326 may be assembled to one-piece frame 350 before any of the other modules being affixed to LiDAR assembly 300.

Figure 6:
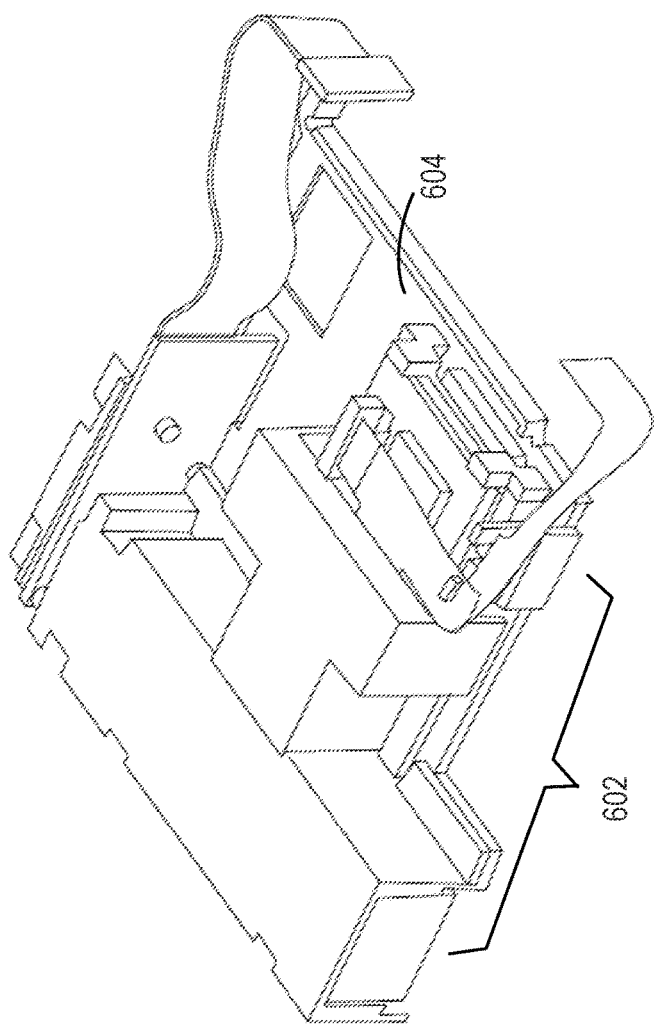
FIG. 6 illustrates an exemplary integrated transmitter-receiver module of the LiDAR assembly shown in FIGS. 3A and 3B, according to embodiments of the present disclosure.
Figure 7:
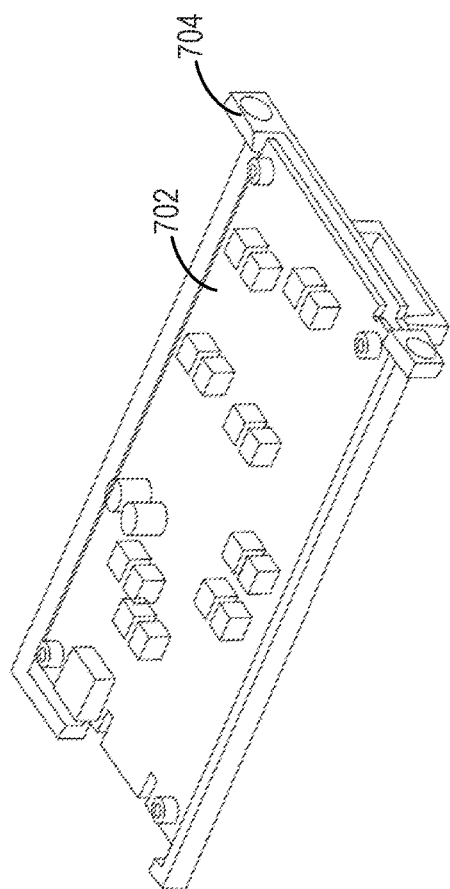
FIG. 7 illustrates an exemplary power module of the LiDAR assembly shown in FIGS. 3A and 3B, according to embodiments of the present disclosure.
Figure 8:
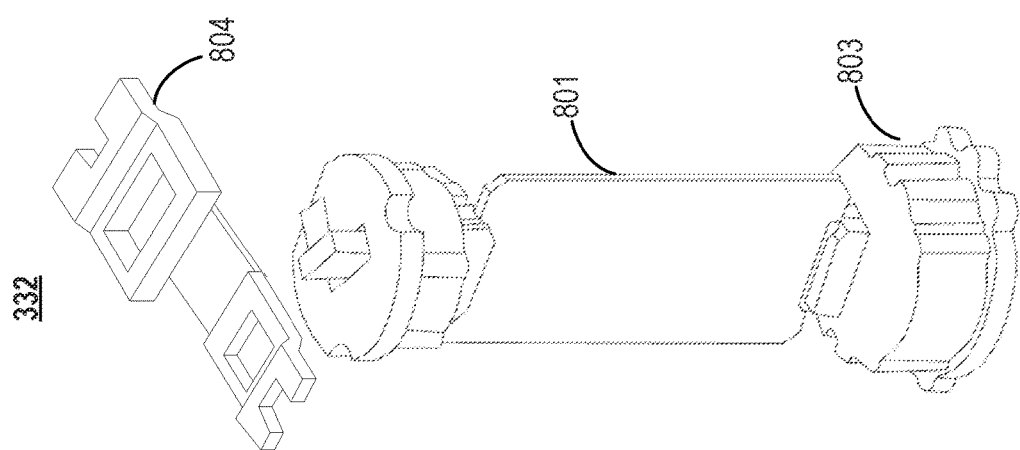
FIG. 8 illustrates an exemplary a mechanical scanning module of the LiDAR assembly shown in FIGS. 3A and 3B, according to embodiments of the present disclosure.
Figure 9:
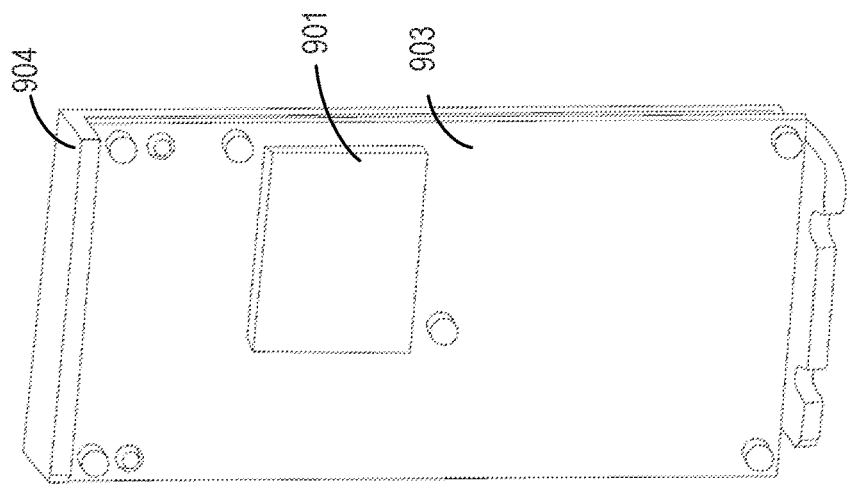
FIG. 9 illustrates an exemplary MEMS scanning module of the LiDAR assembly shown in FIGS. 3A and 3B, according to embodiments of the present disclosure.

Referring back to FIGS. 3A and 3B, in some embodiments, integrated transmitter-receiver module 302, power module 324, mechanical scanning module 332, and MEMS scanning module 334 may respectively be assembled to LiDAR assembly 300 through one-piece frame 350. For example, as illustrated in FIG. 6, functioning components 602 of integrated transmitter-receiver module 302 (e.g., transmitter 204 and receiver 206 shown in FIG. 2) may be integrated on a same base (e.g., affixed to bracket 604) configured to provide support, mounting, and protection to functioning components 602. For example, integrated transmitter-receiver module 302 may be affixed to one-piece frame 350 through bracket 604, e.g., bracket 604 may slide into one-piece frame 350 through first pair of guideways 360 shown in FIG. 4 and may be positioned by lock points 361 on first pair of guideways 360. In some embodiments, after being positioned, bracket 604 may further be affixed to first pair of guideways 360 by being screwed to first pair of guideways 360 through fasteners (not shown) screwed into one or more fastener holes 456. In some embodiments, functioning components 602 may be pre-aligned (e.g., tuning reflectors/receiving lens to focus the returned laser beams onto detectors of receiver 206) before being integrated on the base. Similar to bracket 504, bracket 604 may be a metal bracket, a plastic bracket, or any suitable type of bracket capable of providing stability of the structure and ensure appropriate electrical insulation.

In some embodiments, power module 324 may include power supply circuits for providing electrical power, integrated on a PCB 702 affixed to a bracket 704. Bracket 704 may be configured to provide support, mounting, and protection. For example, power module 324 may be affixed to one-piece frame 350 through bracket 704, e.g., bracket 704 may slide into one-piece frame 350 through second pair of guideways 362 disposed on base 402 of one-piece frame 350 as shown in FIG. 3B and may be positioned by lock points 361 on second pair of guideways 362. In some embodiments, power module 324 may be disposed towards the bottom of one-piece frame 350, e.g., near or on base 402 of one-piece frame 350, beneath integrated transmitter-receiver module 302. In some embodiments, after being positioned, bracket 704 may further be affixed to second pair of guideways 362 by being screwed to second pair of guideways 362 through fasteners (not shown) screwed into one or more fastener holes 456. Similar to bracket 504 and bracket 604, bracket 704 may be a metal bracket, a plastic bracket, or any suitable type of bracket capable of providing stability of the structure and ensure appropriate electrical insulation.

In some embodiments, mechanical scanning module 332 may include a rotatable mirror 801, a mechanical device 803 for rotating/driving rotatable mirror 801 to an angle in a first dimension of the FOV, and a bracket 804 for providing support, mounting, and protection to rotatable mirror 801 and mechanical device 803. In some embodiments, depending on the specific layout of LiDAR assembly 300, mechanical scanning module 332 may further include a reflective mirror 333 shown in FIG. 3B for directing laser beams emitted from integrated transmitter-receiver module 302 to rotatable mirror 801 and for directing returned laser beams reflected by rotatable mirror 801 to integrated transmitter-receiver module 302. In some embodiments, mechanical scanning module 332 may be affixed to one-piece frame 350 by screwing bracket 804 to horizontal beams 406 and by screwing a base of mechanical device 803 to base 402 of one-piece frame 350 respectively through fasteners (not shown) screwed into one or more fastener holes 456 on horizontal beams 406 and base 402. In some embodiments, bracket 804 may be a metal bracket, a plastic bracket, or any suitable type of bracket capable of providing stability of the structure and ensure appropriate electrical insulation.

In some embodiments, MEMS scanning module 334 may include a rotatable mirror/mirror array 901, a MEMS device 903 for rotating/driving rotatable mirror/mirror array 901 to an angle in a second dimension of the FOV, orthogonal to the first dimension, and a bracket 904 for providing support, mounting, and protection to rotatable mirror/mirror array 901 and MEMS device 903. In some embodiments, MEMS scanning module 334 may be affixed to one-piece frame 350 by screwing both ends of bracket 904 (e.g., a top end and a bottom end, opposite to the top end) to one of horizontal beams 406 and base 402 of one-piece frame 350 respectively through fasteners (not shown) screwed into one or more fastener holes 456 on horizontal beams 406 and base 402. In some embodiments, bracket 904 may be a metal bracket, a plastic bracket, or any suitable type of bracket capable of providing stability of the structure and ensure appropriate electrical insulation.

Figure 10:
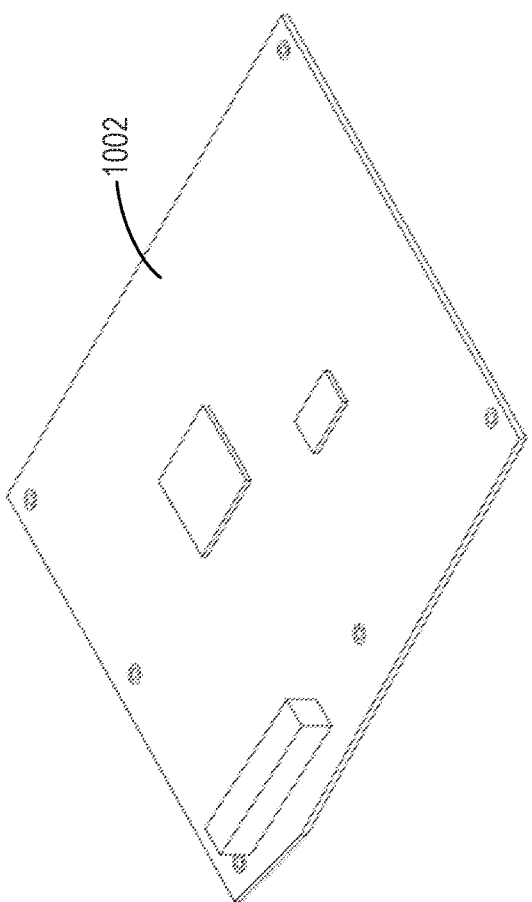
FIG. 10 illustrates an exemplary control module of the LiDAR assembly shown in FIGS. 3A and 3B, according to embodiments of the present disclosure.

Referring back to FIGS. 3A and 3B, in some embodiments, control module 322 may be assembled to the top face of one-piece frame 350 after all the above-mentioned modules are assembled/mounted, parallel to integrated transmitter-receiver module 302. In some embodiments, control module 322 may be affixed to one-piece frame 350 through fasteners (not shown) screwed into one or more fastener holes 456 on horizontal beams 406. For example, as illustrated in FIG. 10, control module 322 may include processing circuits (e.g., an ASIC or a FPGA) integrated on a PCB 1002. PCB 1002 may be configured to provide support, mounting, and protection to the processing circuits. For example, interface module 326 may be affixed to one-piece frame 350 through PCB 1002, e.g., control module 322 may be affixed to one-piece frame 350 by screwing one or more sides of PCB 1002 to at least one of horizontal beams 406 respectively through fasteners (not shown) screwed into one or more fastener holes 456 on horizontal beams 406. As will be described in detail along with the assembling process for LiDAR assembly 300 below, when assembling LiDAR assembly 300, control module 322 may be assembled to one-piece frame 350 after all the other modules being affixed to LiDAR assembly 300.

Figure 11A:
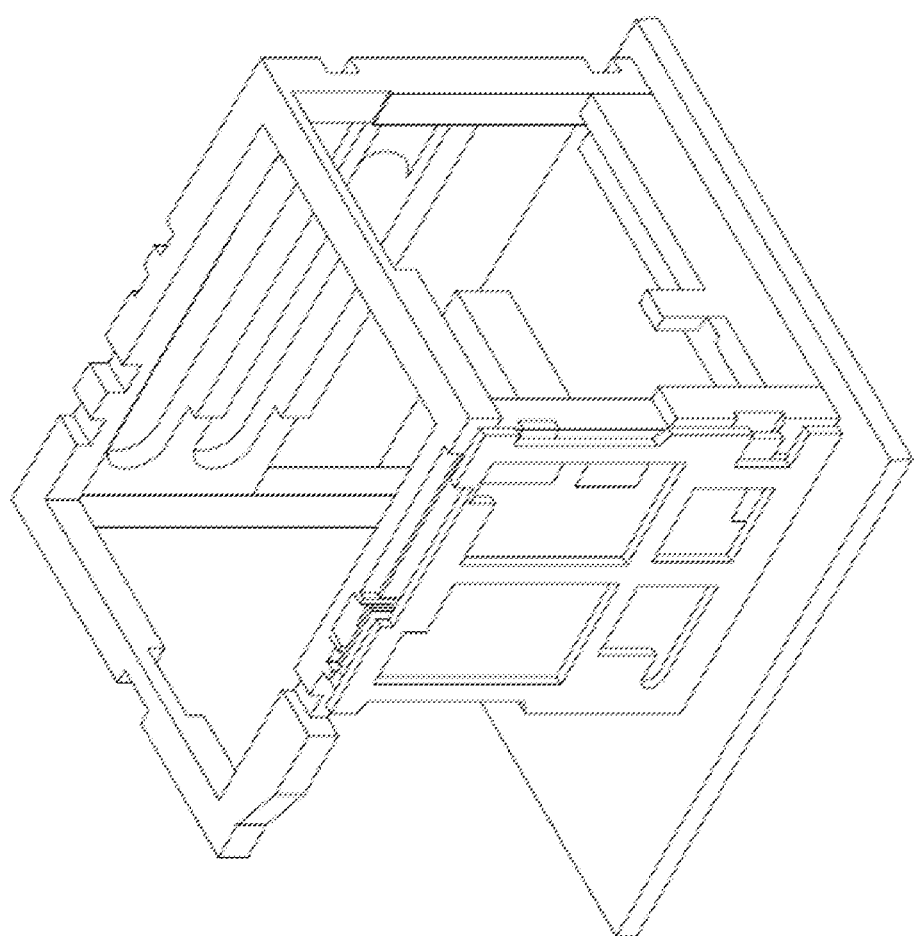
FIGS. 11A-11C illustrate an exemplary assembling process for assembling a LiDAR assembly with modularized components, according to embodiments of the present disclosure.
Figure 11B:
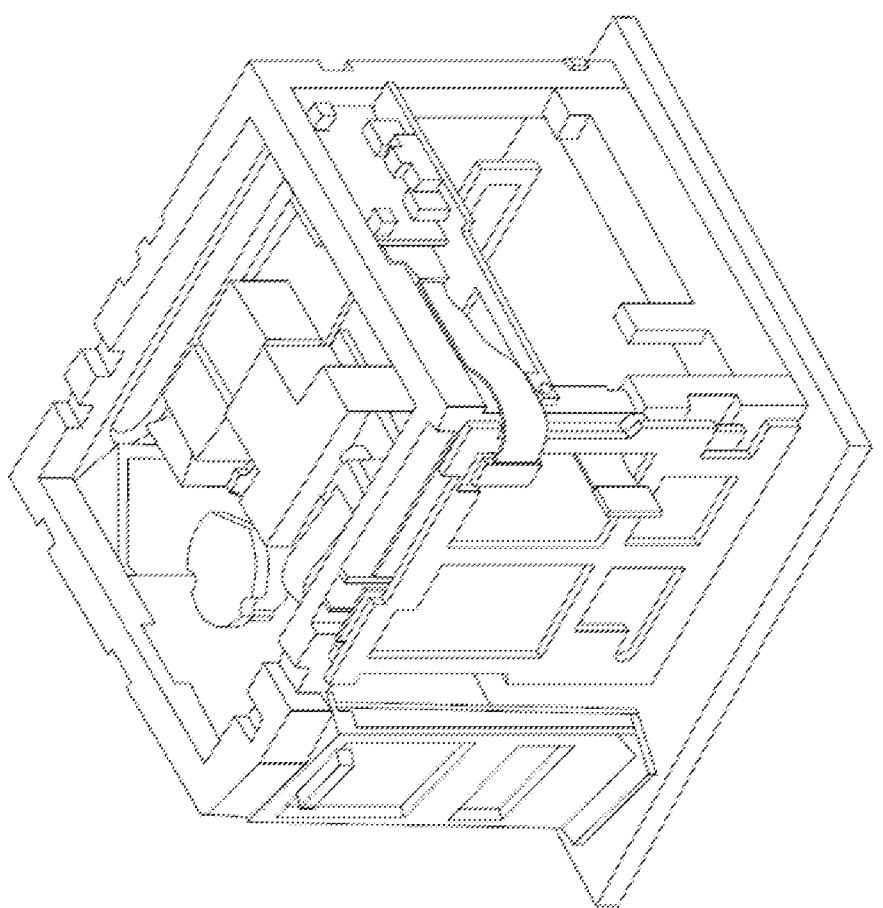
Figure 11C:
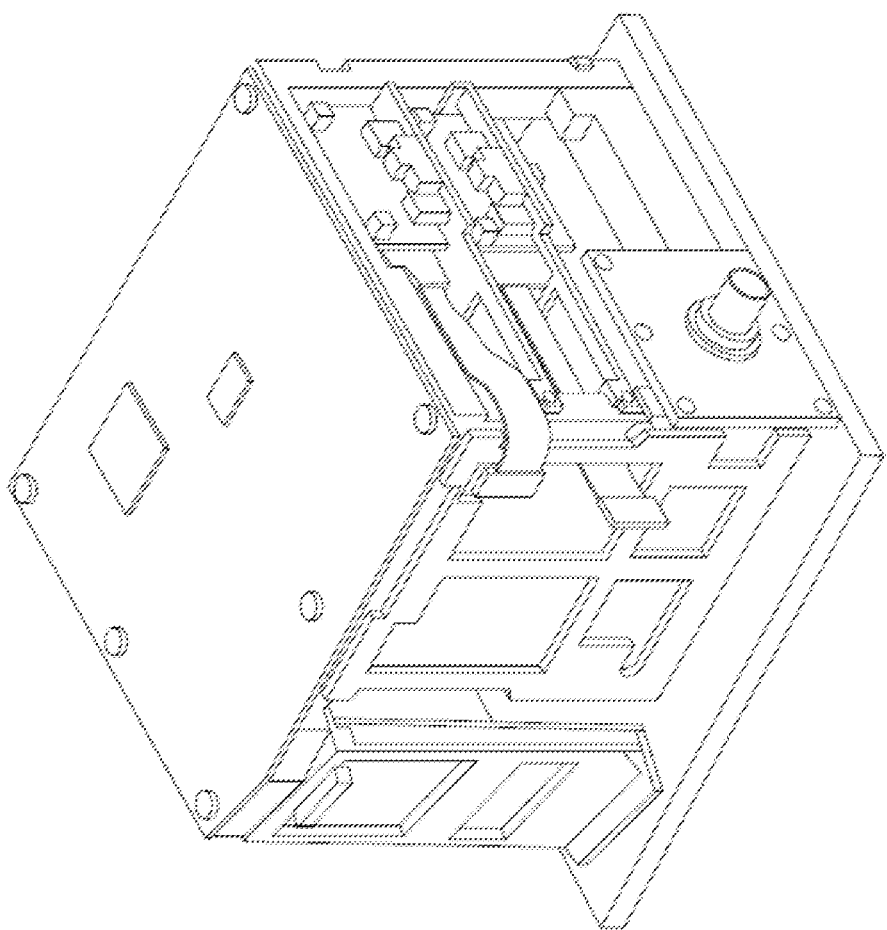
Figure 12:
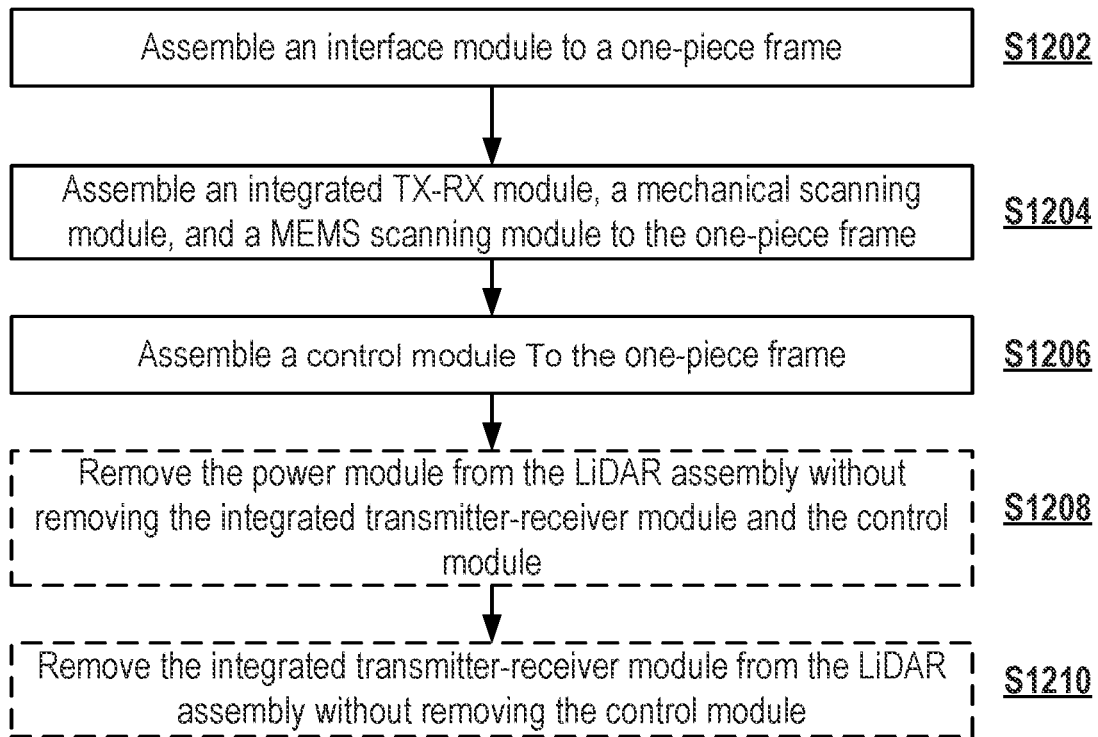
FIG. 12 shows a flowchart of an exemplary method for assembling a LiDAR assembly with modularized components, according to embodiments of the present disclosure.

FIG. 12 shows a flow chart of an exemplary method for assembling a LiDAR assembly with modularized components, according to embodiments of the present disclosure. In some embodiments, method 1200 may be performed for assembling LiDAR assemblies 102 and 300. In some embodiments, method 1200 may include steps S1202-S1210. It is to be appreciated that some of the steps may be optional. Further, some of the steps may be performed simultaneously, or in a different order than that shown in FIG. 12. FIGS. 11A-11C illustrate intermediate structures of the LiDAR assembly during the assembling process.

In step S1202, an interface module (e.g., interface module 326) may be assembled outside a lateral face of a one-piece frame (e.g., one-piece frame 350) and may be affixed to the one-piece frame through fasteners (not shown) screwed into fastener holes on the one-piece frame. In some embodiments, as shown in FIG. 11A, the one-piece frame may include a plurality of horizontal beams supported by a plurality of vertical beams supported by a base. The horizontal beams and the vertical beams collectively form a plurality of openings on a top face opposite the base and at least one lateral face. For example, the interface circuits integrated on the interface module may be integrated on a PCB (e.g., PCB 502) affixed to a bracket (e.g., bracket 504). The interface module may be affixed to the one-piece frame by screwing both ends of the bracket (e.g., a top end and a bottom end, opposite to the top end) to one of the horizontal beams and the base of the one-piece frame respectively through fasteners (not shown) screwed into the fastener holes on the horizontal beams and the base.

In step S1204, an integrated transmitter-receiver module (e.g., integrated transmitter-receiver module 302), a power module (e.g., power module 324), a mechanical scanning module (e.g., mechanical scanning module 332), and a MEMS scanning module (e.g., MEMS scanning module 334) may respectively be assembled to the one-piece frame at predetermined positions. In some embodiments, as shown in FIG. 11B, the integrated transmitter-receiver module, the power module, the mechanical scanning module, and the MEMS scanning module may be sequentially assembled to the one-piece frame using the positioning mechanisms described above respectively. It is contemplated that the sequence for assembling the integrated transmitter-receiver module, the power module, the mechanical scanning module, and the MEMS scanning module is not limited to what is disclosed herein. Any suitable sequence may be applied for assembling those modules. Because the modules can be assembled and accessed independent from one another, the exact order of assembling these modules is entirely flexible.

In some embodiments, after being mounted to the one-piece frame, the integrated transmitter-receiver module may be connected to the interface module by the ribbon cable and the rigid flex cable. For example, the transmitter of the integrated transmitter-receiver module may be connected to the interface module by the ribbon cable and the receiver of the integrated transmitter-receiver module may be connected to the interface module by the rigid flex cable. In some embodiments, the power module may be connected to the interface module by golden fingers.

In step S1206, a control module (e.g., control module 322) may be assembled to the top face of the one-piece frame after all the above-mentioned modules are assembled/mounted. In some embodiments, as shown in FIG. 11C, the control module may be affixed to the one-piece frame through fasteners (not shown) screwed into the fastener holes on the horizontal beams on the top surface of the one-piece frame.

After being mounted to the one-piece frame, the control module may be connected to the interface module by golden fingers for transmitting control signals and receiving electrical power. The MEMS scanning module may be connected to the control module by ribbon cables for receiving control signals (e.g., for controlling the rotation of the rotatable mirror/mirror array of the MEMS scanning module).

It is contemplated that the connections between the above-mentioned modules are for illustrative only. Any suitable connecting methods may be implemented for connecting modules in the LiDAR assembly.

In some embodiments, method 1200 may further include steps S1208 and S1210 for module maintenance and repair purpose. In step S1208, the power module may be removed from the LiDAR assembly without removing the integrated transmitter-receiver module and the control module. For example, as described above, the power module may be removed from the LiDAR assemble through the corresponding guideway (e.g., second guideway 362) from a lateral face of the one-piece frame (e.g., having an opening on the face) without impacting the integrated transmitter-receiver module and the control module.

In step S1210, the integrated transmitter-receiver module may be removed from the LiDAR assembly without removing the control module. For example, as described above, the integrated transmitter-receiver module may be removed from the LiDAR assemble through the corresponding guideway (e.g., first guideway 360) from a lateral face of the one-piece frame (e.g., having an opening on the face) without interfering the control module.

FIG. 13 shows a flow chart of an exemplary optical sensing method performed by a LiDAR system with modularized components, according to embodiments of the present disclosure. In some embodiments, method 1300 may be performed by LiDAR assemblies 102 or 300. In some embodiments, method 1300 may include steps S1302-S1306. It is to be appreciated that some of the steps may be optional. Further, some of the steps may be performed simultaneously, or in a different order than that shown in FIG. 13.

In step S1302, optical signals are emitted by an integrated transmitter-receiver module (e.g., integrated transmitter-receiver module 302) to an environment surrounding the LiDAR assembly (e.g., LiDAR assemblies 102 or 300). As described above, the integrated transmitter-receiver module may be assembled on a first bracket (e.g., bracket 604) before being positioned to the LiDAR assembly. In some embodiments, the integrated transmitter-receiver module may include a transmitter configured to emit laser beams for scanning the environment.

In step S1304, the emitted optical signals are scanned by a scanner (e.g., scanner 230) for scanning a FOV. In some embodiments, the scanner may include a mechanical scanning module (e.g., mechanical scanning module 332) for scanning a first dimension of the FOV and a MEMS scanning module (e.g., MEMS scanning module 334) for scanning a second dimension, orthogonal to the first dimension. In some embodiments, the mechanical scanning module and the MEMS scanning module are affixed to different brackets before being assembled to the LiDAR system.

In step S1306, optical signals returned from the environment (e.g., reflected by an object) are detected by the integrated transmitter-receiver module. As described above, the integrated transmitter-receiver module may further include a receiver configured to detect the returned laser beams. For example, the returned laser beams may be received by the scanner which directs the returned laser beams to the receiver of the integrated transmitter-receiver module.

In some embodiments, in steps S1302-S1306, the integrated transmitter-receiver module and the scanner are controlled by a control module (e.g., control module 322) for emitting, scanning, and detecting the laser beams. For example, the control module may drive the MEMS scanning module to a first angle in a first dimension and drive the mechanical scanning module to a second angle in a second dimension, orthogonal to the first dimension as described above. In some embodiments, the control module is affixed on a PCB board and the integrated transmitter-receiver module is operatively coupled to the control module through an interface module (e.g., interface module 326). The interface module may be affixed to a bracket (e.g., bracket 504) before being positioned to the LiDAR assembly.

In some embodiments, as described above, integrated transmitter-receiver module, the scanner, the control module, and the interface module are positioned to a one-piece frame (e.g., 350) at predetermined positions of the LiDAR assembly through the corresponding brackets and the PCB respectively.

Figure 14:
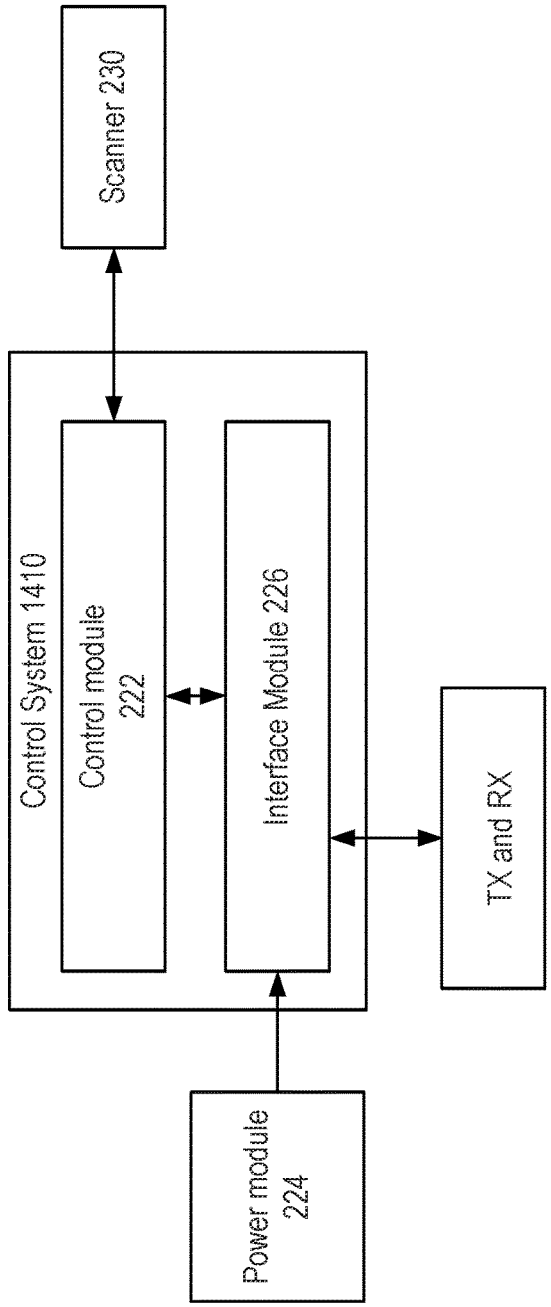
FIG. 14 illustrates a block diagram of an exemplary control system compatible with the LiDAR assembly shown in FIGS. 3A and 3B, according to embodiments of the present disclosure.

FIG. 14 illustrates a block diagram of an exemplary control system 1410 compatible with the LiDAR assembly, according to embodiments of the present disclosure. Control system 1410 may be configured to control the operations of the transmitter, the receiver, and the scanner (e.g., scanner 230) of the LiDAR assembly. In some embodiments, the transmitter and the receiver may be integrated on a same base forming an integrated transmitter-receiver module (e.g., integrated transmitter-receiver module 202) according to the scheme described above. It is contemplated that in some alternative embodiments the transmitter and the receiver can also be disposed on separate bases.

For example, control system 1410 may transmit data to the transmitter and the receiver (e.g., the control signals for controlling the emitting and receiving of the optical signals) and/or the scanner (e.g., the control signals for scanning the FOV). Control system 1410 may also receive data from the receiver (e.g., the data collected by the receiver) and the scanner (e.g., the position information of the scanner). In some embodiments, control system 1410 may also receive electrical power from a power module (e.g., power module 224).

In some embodiments, control system 1410 may include a control module (e.g., control module 222) for generating (e.g., control signals) and processing data (e.g., data received from the receiver and/or the scanner) and an interface module (e.g., interface module 226) for providing interfaces to the control module. For example, control module 222 may include connector interfaces, configured to connect with interface module 226 for receiving electrical power and for exchanging data (e.g., receiving and transmitting data). Control module 222 may also include connector interfaces configured to connect with scanner 230 (e.g., the MEMS scanning module and the mechanical scanning module respectively) for exchanging data. Interface module 226 may include different connector interfaces connected to the modules such as power module 224, the transmitter module, and the receiver module, e.g., for interfacing between control module 222 and the individual modules controlled by control module 222.

Figure 15B:
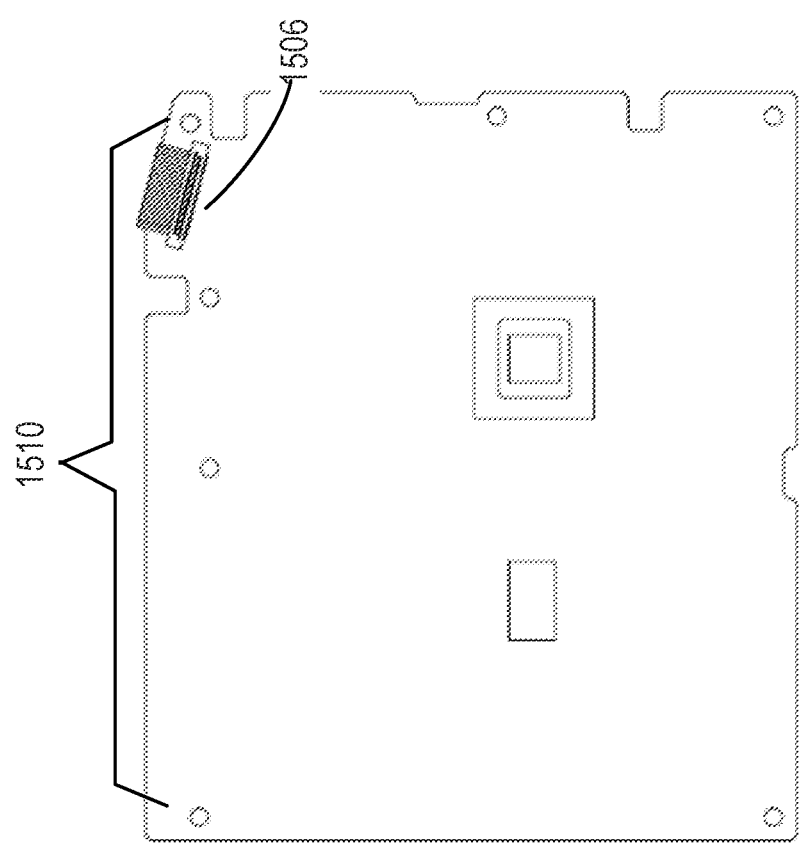

FIGS. 15A-15B respectively illustrate a bottom top side (towards an inner space of the LiDAR assembly) and a top side (towards an outer space of the LiDAR assembly) of exemplary control module 222 compatible with control system 1410, according to embodiments of the present disclosure. In some embodiments, control module 222 may include connector interfaces (e.g., connector interfaces 1502, 1504, and 1506 (shown in FIG. 15B)), a processing unit (not explicitly shown) for processing the data, and a PCB (e.g., PCB 1508) where the connector interfaces and the processing unit are disposed on. The connector interfaces may be configured to connect with interface module 226 and scanner 230.

Specifically, as illustrated in FIG. 15A, control module 222 may include connector interface 1502 configured to connect with interface module 226 shown in FIG. 14. In some embodiments, connector interface 1502 may be a golden finger connector interface, through which the data (e.g., control signals for controlling the operation of the transmitter and the receiver and/or data collected by the receiver) is transmitted and received. In some embodiments, control module 222 may also include connector interfaces 1504 and 1506 (shown in FIG. 15B), configured to connect with different modules of scanner 230 shown in FIG. 14. For example, connector interface 1504 may be a ribbon cable connector, connected to the mechanical scanning module of scanner 230 for driving the mechanical scanning module to an angle in a first dimension of the FOV. Connector interface 1506 may be a ribbon cable connector, connected to the MEMS scanning module of scanner 230 for driving the MEMS scanning module to an angle in a second dimension of the FOV, orthogonal to the first dimension.

In some embodiments, the processing unit may include components (not shown) such as a processor, a memory, and a storage for performing various control functions. In some embodiments, these components of the processing unit may be implemented on an integrated circuit (IC), for example, an application-specific integrated circuit (ASIC) or a field-programmable gate array (FPGA)).

In some embodiments, control module 222 may further include PCB 1508, where connector interfaces 1502, 1504, and 1506 and the processing unit are disposed on. As described above, in some embodiments, PCB 1508 may be a board that has one or more etched sheet layers (e.g., layers with etched conductive tracks, pads, and/or other suitable conductive features) disposed on a non-conductive substrate. Electrical components such as connector interfaces 1502, 1504, and 1506 and the processing unit may be disposed on an etched sheet layer and may be mechanically supported and electrically connected by the etched sheet layer.

In some embodiments, PCB 1508 may include a set of fastener holes 1510 disposed in any suitable manner on the surface for affixing control module 222 (e.g., through PCB 1508) to the LiDAR assembly at the predetermined position, e.g., a top face of the frame of the LiDAR assembly. For example, fastener holes 1510 may correspond to at least some of fastener holes 456 (e.g., shown in FIG. 4) disposed on the top face of the frame. Specifically, after control module 222 is positioned at the predetermined position, fastener holes 1510 may be fastened to those corresponding fastener holes 456 disposed on the horizontal beams (e.g., beams 406) forming the top face of the frame.

Figure 16A:
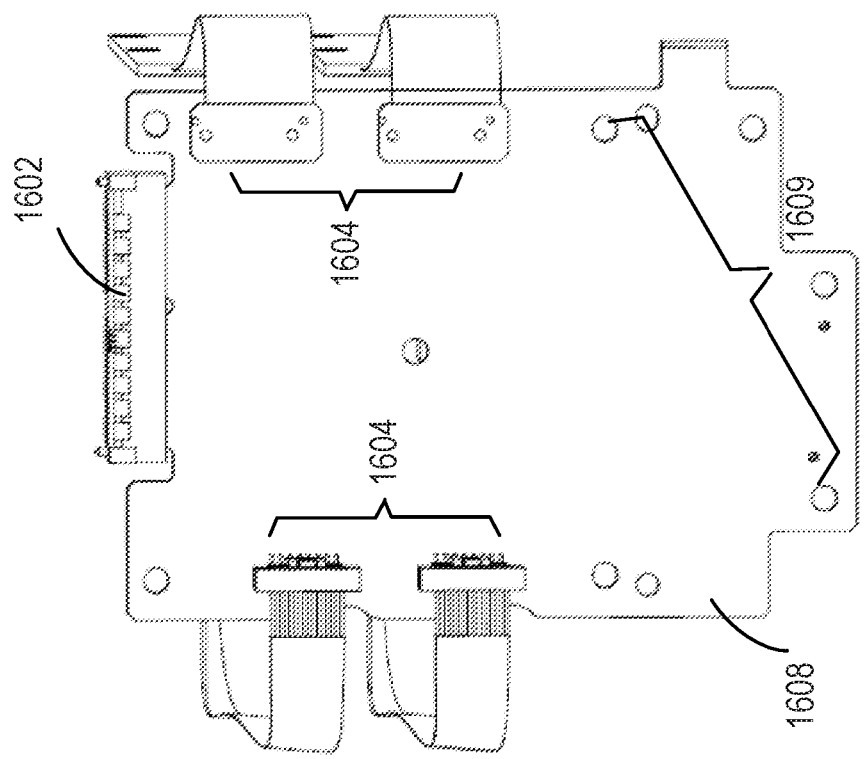
FIGS. 16A-16C illustrate an exemplary interface module compatible with the control system shown in FIG. 14, according to embodiments of the present disclosure.
Figure 16B:
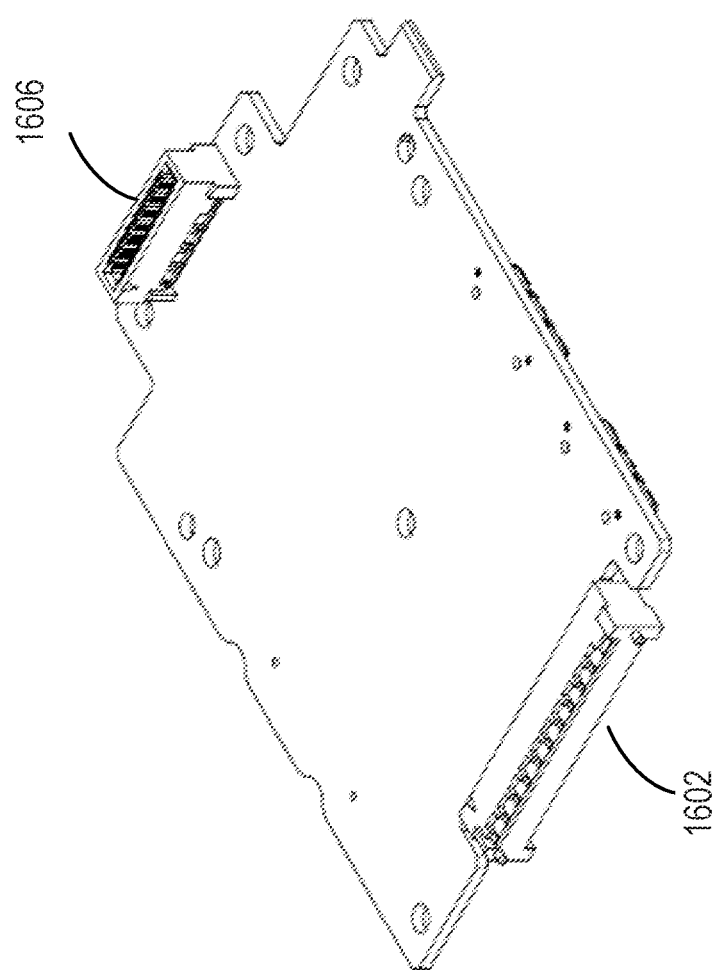
Figure 16C:
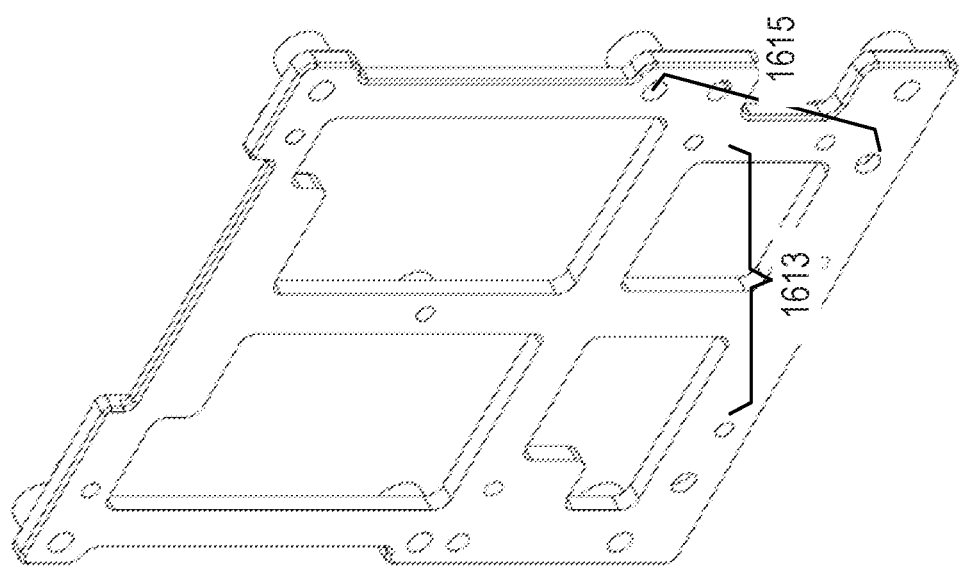

FIGS. 16A-16C illustrate exemplary interface module 226 compatible with control system 1410, according to embodiments of the present disclosure. In some embodiments, as shown in FIG. 16A, interface module 226 may include a connector interface 1602 configured to connect with control module 222 for transmitting/receiving data and transmitting electrical power (e.g., the electrical power for driving control module 222, the transmitter, and the receiver). For example, connector interface 1602 may be a golden finger connector corresponding to (e.g., engaging with) connector interface 1502 of control module 222.

In some embodiment, interface module 226 further includes connector interfaces 1604 configured to exchange data with and transmit electrical power to the transmitter and the receiver. For example, connector interfaces 1604 may include ribbon cable connector interface(s) (e.g., be connected to an emitter of the transmitter through a ribbon cable) and rigid flex cable connector interface(s) (e.g., be connected to the receiver through a rigid flex cable). In some embodiments, connector interfaces 1602 and 1604 may be disposed on a first face of the frame, towards an outside of the LiDAR assembly.

In some embodiments, as illustrated in FIG. 16B, interface module 226 may further include a connector interface 1606 disposed on a second face of the frame, opposite to the first face (e.g., towards the inside of the LiDAR assembly) configured to connect with a power module (e.g., power module 224) for receiving electrical power. In some embodiments, interface module 226 may further include a PCB 1608 where connector interfaces 1602, 1604, and 1606 are disposed on. In some embodiments, PCB 1608 may have a similar mechanical structure as PCB 1510 and the descriptions of the same will not be repeated.

In some embodiments, PCB 1608 may include a set of fastening holes 1609, configured to affix PCB 1608 to a bracket 1612 shown in FIG. 16C. Bracket 1612 is configured to provide support and mounting to interface module 226. For example, as illustrated in FIG. 16C, bracket 1612 may include a first set of fastener holes 1613 corresponding to fastener holes 1609 on PCB 1608, configured to affix PCB 1608 to bracket 1612.

In some embodiments, bracket 1612 may also include a second set of fastener holes 1615 corresponding to fastener holes 456 (e.g., the positioning mechanism of the frame shown in FIG. 4), configured to affix interface module 226 to the frame of the LiDAR assembly. For example, after interface module 226 is positioned at the predetermined position (e.g., outside a lateral face of the frame, formed by vertical beams of the frame), fastener holes 1615 may engage fastener holes 456 through any suitable type of fasteners (e.g., being fastened together by the fastener). Accordingly, interface module 226 may be assembled outside the lateral face of the frame through bracket 1612.

Figure 17:
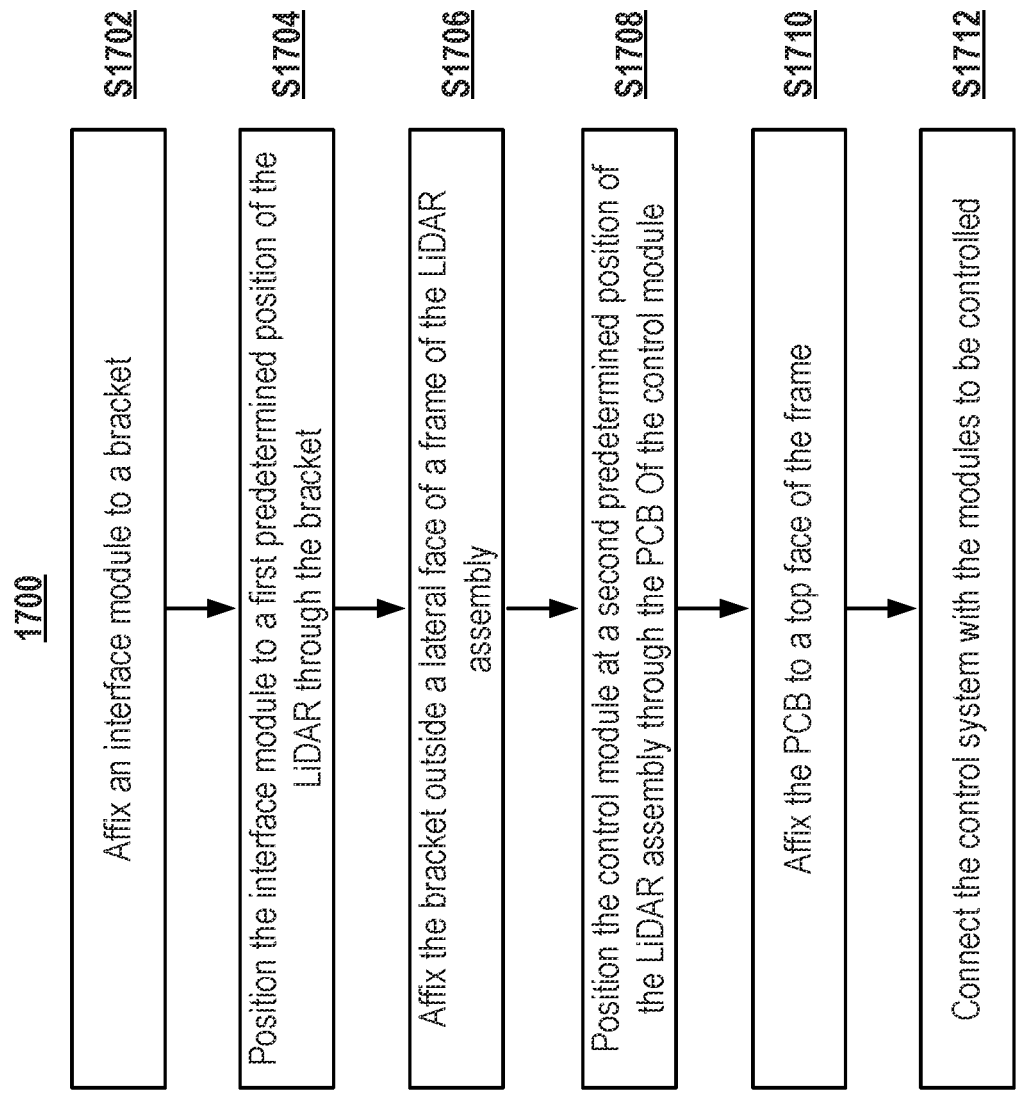
FIG. 17 shows a flow chart of an exemplary method for assembling a control system, according to embodiments of the present disclosure.

FIG. 17 shows a flow chart of an exemplary method for assembling a control system, according to embodiments of the present disclosure. In some embodiments, method 1700 may include steps S1702-S1710. It is to be appreciated that some of the steps may be optional. Further, some of the steps may be performed simultaneously, or in a different order than that shown in FIG. 17.

In step S1702, an interface module (e.g., interface module 226) may be affixed to a bracket (e.g., bracket 1608). For example, the PCB of the interface module may include a set of fastener holes (e.g., fastener holes 1609) corresponding to a first set of fastener holes (e.g., fastener 1613) on the bracket. The interface module may be affixed to the bracket by fastening the fastener holes on the PCB and the corresponding fastener holes on the bracket using any suitable fasteners.

In step S1704, the interface module may be positioned to a first predetermined position of the LiDAR assembly through the bracket. For example, the interface module may be positioned outside a lateral face of the frame of the LiDAR assembly, formed by at least one vertical beam of the frame.

In step S1706, the bracket of the interface module may be affixed outside the lateral face of the frame of the LiDAR assembly. For example, the bracket of the interface module may include a second set of fastener holes (e.g., fastener holes 1615) corresponding to the fastener holes (e.g., fastener holes 456) on the vertical beam of the frame. The second set of fastener holes and the corresponding fastener holes on the frame may be fastened using any suitable fasteners.

In step S1708, the control module (e.g., control module 222) may be positioned at a second predetermined position of the LiDAR assembly through the PCB of control module. For example, the PCB of the control module may be positioned at a top face of the frame of the LiDAR assembly, formed by at least one horizontal beam of the frame.

In step S1710, the PCB of the control module may be affixed to the top face of the frame of the LiDAR. For example, the PCB of the control module may include a set of fastener holes (e.g., fastener holes 1508) corresponding to the fastener holes on the horizontal beams of the frame. The PCB may be affixed to the frame by fastening the fastener holes on the PCB and the corresponding fastener holes on the frame using any suitable fasteners.

In step S1712, the control system may be connected to the modules to be controlled by the control system through the connector interfaces. For example, the interface module of the control system may be connected to an emitter of a transmitter (e.g., using a ribbon cable), the receiver (e.g., using rigid flex cable), and the power module through the connector interfaces described above. The control module may also be connected to the different components of the scanner (e.g., the MEMS scanning module and/or the mechanical scanning module) through the connector interfaces described above.

Although the disclosure is made using a LiDAR system as an example, the disclosed embodiments may be adapted and implemented to other types of optical sensing systems that use optical signals not limited to laser beams. For example, the embodiments may be readily adapted for optical imaging systems or radar detection systems that use electromagnetic waves to scan objects. Further, the disclosed embodiments may be adapted and implemented to other types of systems that include multiple function modules that are pre-positioned in the system, and the function modules may require repair or replacement after assembly. The disclosed systems and methods facilitate accurate assembly of the function modules while allowing easy access to the modules.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:
1. A control system for a LiDAR assembly, comprising:
a control module affixed on a printed circuit board (PCB), configured to control a transmitter and a receiver of the LiDAR assembly to emit and receive optical signals; and
an interface module affixed on a first bracket, configured to operatively couple the control module to the transmitter and the receiver,
wherein the control module and the interface module are configured to be positioned at predetermined positions of the LiDAR assembly through the PCB and the first bracket respectively.
2. The control system of claim 1, wherein the PCB and the first bracket are configured to be affixed on a frame of the

LiDAR assembly respectively through a first positioning mechanism and a second positioning mechanism of the frame.

3. The control system of claim 2, wherein the first positioning mechanism of the frame comprises a first set of fastener holes and the PCB comprises a second set of fastener holes corresponding to the first set of fastener holes, wherein the control module is configured to be affixed to the frame through the first and the second set of fastener holes.

4. The control system of claim 2, wherein the second positioning mechanism of the frame comprises a first set of fastener holes and the first bracket comprises a second set of fastener holes corresponding to the first set of fastener holes, wherein the interface module is configured to be affixed to the frame through the first and the second set of fastener holes.

5. The control system of claim 2, wherein the control module is configured to be assembled to a top face of the frame formed by at least one horizontal beam of the frame, wherein the PCB is configured to be affixed to the at least one horizontal beam through the first positioning mechanism located on the at least one horizontal beam.

6. The control system of claim 2, wherein the interface module is configured to be assembled outside a lateral face of the frame formed by at least one vertical beam of the frame, wherein the first bracket is configured to be affixed to the at least one vertical beam through the second positioning mechanism located on the at least one vertical beam.

7. The control system of claim 1, wherein the interface module is configured to be further connected to a power module affixed to a second bracket and positioned in the LiDAR assembly through the second bracket, wherein the interface module is configured to be connected to the power module through golden fingers, wherein the power module is configured to provide electrical power to the control system, the transmitter and the receiver.

8. The control system of claim 7, wherein the transmitter and the receiver are pre-aligned and disposed on a shared base to form an integrated transmitter-receiver module, wherein the integrated transmitter-receiver module is positioned in the LiDAR assembly through the shared base.

9. The control system of claim 1, wherein the control module is further configured to drive a scanner of the LiDAR assembly to scan the emitted optical signal to form a two-dimensional (2D) field of view (FOV).

10. The control system of claim 1, wherein the interface module is configured to be connected to the control module through golden fingers.

11. The control system of claim 1, wherein the interface module is configured to be connected to an emitter of the transmitter through a ribbon cable, wherein the emitter is configured to emit the optical signals.

12. The control system of claim 1, wherein the interface module is configured to be connected to the receiver through a rigid flex cable, wherein the receiver is configured to receive returned optical signals.

13. A method for assembling a control system for a LiDAR assembly, comprising:
assembling an interface module affixed to a first bracket at a first predetermined position of the LiDAR assembly through the first bracket; and
assembling a control module affixed to a PCB at a second predetermined position of the LiDAR assembly through the PCB,
wherein the control module is configured to control a transmitter and a receiver of the LiDAR assembly to emit and receive optical signals, and
wherein the control module is operatively coupled to the transmitter and the receiver through the interface module.

14. The method of claim 13, wherein
assembling the interface module affixed to the first bracket comprises affixing the first bracket outside a lateral face of a frame of the LiDAR assembly through a first positioning mechanism of the frame; and
assembling the control module affixed to a PCB comprises affixing the PCB to a top face of the frame through a second positioning mechanism of the frame.

15. The method of claim 14, wherein the first positioning mechanism of the frame comprises a first set of fastener holes and the first bracket comprises a second set of fastener holes corresponding to the first set of fastener holes on the frame, wherein affixing the first bracket to the lateral face of the frame further comprises:
fastening the first and the second set of fastener holes using fasteners.

16. The method of claim 14, wherein the second positioning mechanism of the frame comprises a first set of fastener holes and the PCB comprises a second set of fastener holes corresponding to the first set of fastener holes on the frame, wherein affixing the PCB to the top face of the frame further comprises:
fastening the first and the second set of fastener holes using fasteners.

17. The method of claim 13, further comprising:
connecting the interface module to an emitter of the transmitter using a ribbon cable; and
connecting the interface module to the receiver using a rigid flex cable.

18. A LiDAR assembly, comprising:
a transmitter configured to emit optical signals to an environment surrounding the LiDAR assembly;
a receiver configured to detect returned optical signals from the environment; and
a control system configured to control operations of the transmitter and the receiver, wherein the control system comprises:
a control module affixed on a printed circuit board (PCB), configured to control the operation of the transmitter and the receiver; and
an interface module affixed on a first bracket, configured to operatively couple the transmitter and the receiver with the control module,
wherein the control module and the interface module are positioned at predetermined positions of the LiDAR assembly through the PCB and the first bracket respectively.

19. The LiDAR assembly of claim 18, wherein the PCB and the first bracket are affixed on a frame of the LiDAR assembly respectively through a first positioning mechanism and a second positioning mechanism of the frame.

20. The LiDAR assembly of claim 19, wherein the interface module is further connected to a power module affixed to a second bracket and positioned in the LiDAR assembly through the second bracket, wherein the interface module is connected to the power module through golden fingers, wherein the power module is configured to provide electrical power to the control system, the transmitter and the receiver.

* * * * *